(12) United States Patent
Yousefi'zadeh et al.

(10) Patent No.: US 8,665,890 B2
(45) Date of Patent: Mar. 4, 2014

(54) HYBRID CROSS-LAYER ROUTING PROTOCOL FOR MANETS

(75) Inventors: Homayoun Yousefi'zadeh, Irvine, CA (US); Xiaolong Li, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 50 days.

(21) Appl. No.: 13/475,586

(22) Filed: May 18, 2012

(65) Prior Publication Data

US 2012/0294152 A1    Nov. 22, 2012

Related U.S. Application Data

(60) Provisional application No. 61/488,657, filed on May 20, 2011.

(51) Int. Cl.
*H04L 12/28* (2006.01)

(52) U.S. Cl.
USPC ........... 370/401; 370/230; 370/236; 370/468; 455/450

(58) Field of Classification Search
USPC ........ 370/229–232, 235–237, 238, 252, 400, 370/401, 328–330, 468; 455/450–453
See application file for complete search history.

(56) References Cited

U.S. PATENT DOCUMENTS

| | | | |
|---|---|---|---|
| 6,363,319 B1 * | 3/2002 | Hsu | 701/533 |
| 6,721,800 B1 * | 4/2004 | Basso et al. | 709/239 |
| 7,111,074 B2 * | 9/2006 | Basturk | 709/241 |
| 7,177,295 B1 | 2/2007 | Sholander et al. | |
| 7,339,897 B2 | 3/2008 | Larsson et al. | |
| 7,362,723 B2 | 4/2008 | Guo et al. | |
| 7,423,970 B2 | 9/2008 | Wang et al. | |
| 7,522,551 B2 | 4/2009 | Giaimo et al. | |
| 7,668,173 B2 | 2/2010 | Zhao | |
| 7,675,940 B2 | 3/2010 | Rajkotia | |
| 7,729,278 B2 | 6/2010 | Chari et al. | |
| 7,733,908 B1 | 6/2010 | Evans | |
| 7,764,635 B2 | 7/2010 | Chen et al. | |
| 7,826,373 B2 | 11/2010 | Kolavennu et al. | |
| 7,835,734 B2 | 11/2010 | Eckert et al. | |
| 2006/0182034 A1 * | 8/2006 | Klinker et al. | 370/238 |
| 2012/0179800 A1 * | 7/2012 | Allan et al. | 709/223 |

OTHER PUBLICATIONS

Johnson, The Dynamic Source Routing Protocol (DSR) for Mobile Ad Hoc Networks for IPv4, IETF RTC 4728, Feb. 2007.
Perkins, Ad hoc On-Demand Distance Vector (AODV) Routing, IETF RFC 3561, Jul. 2003.
Perkins, Highly Dynamic Destination-Sequenced Distance Vector (DSDV) for Mobile Computers, Proc. ACM SIGCOMM, Aug. 1994.

(Continued)

*Primary Examiner* — Kerri Rose
(74) *Attorney, Agent, or Firm* — Marcus C. Dawes; Daniel L. Dawes (57) ABSTRACT

A Hybrid Cross-Layer Routing (HCLR) protocol designed and implemented based on the premise of being able to leverage a pair of proactive and reactive routing schemes in Mobile Ad Hoc Networks (MANETs) which is used to compensate against wireless link effects thereby allowing for making more intelligent routing decisions. Compared to standalone proactive or reactive routing protocols, HCLR provides a two-tier improvement logic by performing local on-demand search in an n-hop neighborhood utilizing a 2-tuple cross-layer routing metric. HCLR is implemented in a Linux Quagga suite and its performance improvements compared to OSPF MANET Designated Routing (MDR) through emulation studies is demonstrated.

17 Claims, 4 Drawing Sheets

(56) References Cited

OTHER PUBLICATIONS

Clausen, Optimized Link State Routing Protocol (OSLR), IETF RFC 3626, Oct. 2003.
Ogier, Mobile Ad Hoc Network (MANET) Extension of OSPF Using Connected Dominating Set (CDS) Flooding, IETF RFC 5614, Aug. 2009.
Roy, Extensions to OSPF to Support Mobile Ad Hoc Networking, IETF RFC 5614, Mar. 2010.
Holter, Wireless Extensions to OSPF: Implementation of the Overlapping Relays Proposal, Thesis, Univ. of Oslo, May 2006.
Iannone, Cross-layer routing in wireless mesh networks, Proc. Wireless Communication Systems, Sep. 2004.
Park, Expected Data Rate: An Accurate High-Throughput Path Metric for Multi-Hop Wireless Routing, Proc. IEEE SECON 2005, Sep. 2005.
Draves, Routing in Multi-Radio, Multi-Hop Wireless Mesh Networks, Proc. ACM IMobicon, Sep. 2003.
Iannone, The Real Gain of Cross-Layer Routing in Wireless Mesh Networks, Proc. ACM International Symp. on Mobile Ad Hoc Networking & Computing, Sep. 2006.
Bicket, A High Throughput Path Metric for MultiHop Wireless Routing, Proc. ACM IMobicom, 2004.
Carrera, A Cross-Layer Load-Independent Link Cost Metric for Wireless Mesh Networks, Proc. ACM CoNEXT, Dec. 2007.
Subramanian, Interference Aware Routing in Multi-Radio Wireless Mesh Networks, Proc. IEEE WiMesh, Sep. 2006.
Al-Khwildi, Adaptive Link-Weight Routing Protocol Using Cross-Layer Communication for MANET, WSEAS Trans. and Comm., 2007, 833-839, vol. 6, No. 11.
Sivakumar, Routing in Ad-Hoc Networks with MIMO links, Proc. IEEE ICNP, 2005.
Haas, The Zone Routing Protocol (ZRP) for Ad Hoc Networks, 2002.
Choudhury, Mac-Layer Anycasting in Ad Hoc Networks, SIGCOMM Comput. Commun., 2004, 75-80, 34.

\* cited by examiner

FIG. 8

HYBRID CROSS-LAYER ROUTING PROTOCOL FOR MANETS

RELATED APPLICATIONS

The present application is related to U.S. Provisional Patent Application Ser. No. 61/488,657, filed on May 20, 2011, which is incorporated herein by reference and to which priority is claimed pursuant to 35 USC 120.

BACKGROUND

1. Field of the Technology

The disclosure relates to the field of wireless network routing, specifically routing protocols that perform intelligent cross-layer routing among equal cost multi-paths.

2. Description of the Prior Art

Over the past few years, a wide variety of routing protocols have been developed for mobile ad hoc networks (MANETs). These protocols can be generally classified into two categories: reactive (source driven) and proactive (table driven) protocols. Several previous Reactive Routing Protocols (RRPs) used in the past only create a route between a pair of source and destination nodes when the source node actually needs to send packets to the destination. While these protocols can avoid network wide topology information flooding, they are often subject to long latencies. In contrast, previous Proactive Routing Protocols (PRPs) in the past attempt at maintaining consistent and up-to-date routing information in each node by propagating updates throughout the network. Although a route to every other node is always available, such protocols introduce a significant bandwidth overhead due to the broadcast nature of exchanging routing information over wireless media. Still further proposals previously implemented are meant to reduce the overhead associated with routing information exchange by adding capabilities appropriate to radio interfaces while keeping the behavior on other interfaces untouched.

A cross-layer routing protocol utilizes link quality information available at the MAC/PHY layer to directly or indirectly make routing decisions. The media access control (MAC) data communication protocol sublayer, is a sublayer of the data link layer specified in the seven-layer OSI model (layer 2). Layer 1 is the physical layer, PHY. It provides addressing and channel access control mechanisms that make it possible for several terminals or network nodes to communicate within a multiple access network that incorporates a shared medium, e.g. Ethernet. The hardware that implements the MAC is referred to as a medium access controller. The MAC sub-layer acts as an interface between the logical link control (LLC) sublayer and the network's physical layer. The MAC layer emulates a full-duplex logical communication channel in a multi-point network. This channel may provide unicast, multicast or broadcast communication service.

Among new cross-layer techniques, previous works directly incorporate link quality information into the calculation of the cost, while the still other works detect the undergoing link effects by injecting probing packets. However, both set of these previous approaches ignore the difference between the time scales of link quality variations and routing table discovery/update latencies. This problem is commonly referred to as the "Time Scale Difference" (TSD) problem. Routing updates typically occur over time scales in the order of seconds, while wireless link effects occur over time scales in the order of milliseconds. In the case of reactive routing protocols, the best link quality path identified at the time of discovery may no longer be that path at the time of packet forwarding. In the case of proactive routing, routing tables periodically converge after each node receives the topology updates. The update interval is usually set to several seconds to avoid oscillations. Thus, there is no way to guarantee the link is in its high quality state upon arrival of a packet at an intermediate node. In particular, PRPs are capable of performing Equal Cost Multi-Paths (ECMP) routing, which is typically used for load balancing among redundant paths in wired networks. In MANETs, however, the costs of all ECMP paths are highly unlikely to be equal considering time-varying link qualities.

A wide variety of techniques have emerged to improve routing efficiency in MANETs, focusing on two categories of works: techniques utilizing the link quality information, and those using the concept of hybrid routing.

A large body of work related to techniques utilizing the link quality information is routing metric oriented. These works mostly focus on developing new routing metrics that can represent link quality information available at PHY and MAC layers. Other works directly utilize the link quality information computed at MAC/PHY, while still other previous attempts indirectly probe the link quality in terms of packet loss rate. Both adaptive link-weight routing and routing in ad hoc networks with multiple-input multiple-output links take a step further by introducing bidirectional cross-layer approaches. Other works define and evaluate the performance of a triple-metric of rate, interference, and packet success rate using a cross-layer approach.

Zone Routing Protocol (ZRP) for ad hoc networks utilizes the concept of hybrid route discovery and selection. ZRP only uses a proactive approach to collect local topology information without generating a global routing table. The reactive component of ZRP performs global route discovery through the multicast based "bordercast" mechanism in order to propagate route queries throughout the network as oppose to relying on neighbor-broadcast flooding found in traditional reactive protocols.

What is needed is an improved routing efficiency by performing intelligent cross-layer routing among ECMPs. In the absence of ECMPs and given an individual hop selected in the shortest path route, there might exist alternatives with a higher number of hops but lower packet loss rate and delay. By identifying such alternatives, routing efficiency can be improved by performing local hop-based on-demand search.

BRIEF SUMMARY

We disclose a Hybrid Cross-Layer Routing (HCLR) protocol that can react based on the link quality information measured at the MAC layer. HCLR consists of a pair proactive and reactive components. While the proactive component generates global routing paths and avoids long delays associated with RRPs, the reactive component makes local routing decisions based on the available cross-layer information.

First, we disclose a novel cross-layer approach to overcome the limitations of both proactive and reactive routing in MANETs. Second, we use a modular design approach that allows for compatibility and easy deployment. Specifically, HCLR can transparently operate with any PRP as long as the PRP is ECMP-capable. Third, we disclose a local on-demand routing discovery scheme in an n-hop neighborhood that can significantly improve routing efficiency without incurring long delays. Fourth, we disclose a 2-tuple cross-layer routing metric that can overcome the limitations of performing load balancing with ECMP. Finally, we implement HCLR in Linux Quagga routing suite. We also build an emulation test bed utilizing Linux Namespace virtualization technology and NS3 emulator.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Essentially, a routing protocol identifies one or a number of minimum routing cost paths from a source to a destination. The routing cost is measured based on a priori or on-demand known factors such as the hop count, delay, or other quantities of interest. Given an intermediate node of a MANET where more than one link are associated with the minimum cost path, it is highly likely that some of those links are affected by transient low qualities or even intermittent loss of connectivity. Forwarding packets on such links results in experiencing random bit errors and packet erasures. While it is preferred to choose a high quality link at the time of forwarding, a routing layer protocol operating at the network layer is not able to identify such links due to the lack of availability of information at the network layer. Link layer information can be utilized in making intelligent routing decisions at the network layer, only if it can be relayed from the MAC protocol to the routing protocol.

That said, various routing protocols, including OSPF and ISIS, explicitly allow ECMP routing. Moreover, modern Linux kernels by default support ECMP and provide certain load balancing algorithms. However, these prior works have failed to explore the potential of performing cross-layer routing with ECMP. Notably, applying ECMP could lead to problems for path MTU discovery and variable latencies causing out of order delivery, which can negatively affect the performance of transport layer protocols such as TCP. It is discussed further below how HCLR can avoid these problems.

HCLR includes three major components: Proactive Routing (PR), Reactive Routing (RR), and Cross-Layer Interface (CLI). Specifically, the PR could be any existing PRP, such as OSPF MDR which disseminates the topology information and generates the baseline routing table using the hop count metric. Notably, the PR operates as a standalone routing protocol even oblivious to the existence of other components. This feature allows for easy deployment of HCLR. The RR is actually designed as a light weight on-demand routing protocol. Rather than being a heavy weight protocol utilizing broadcasting and/or multicasting of packets to query the entire routing path from a source to a destination, the RR only performs a light weight routing discovery in a local n-hop neighborhood on the basis of the global routing table already generated by the PR. The RR would periodically query the link quality information from the MAC at a certain time interval. This time interval is adaptive to frequency and link strength variations. The CLI bridges the routing components and the MAC layer. The Netlink Socket interface available with Linux serves as the CLI to communicate with the MAC layer considering the fact that many routing protocol implementations employ the Netlink Socket to communicate with the Linux kernel.

Figure 1:
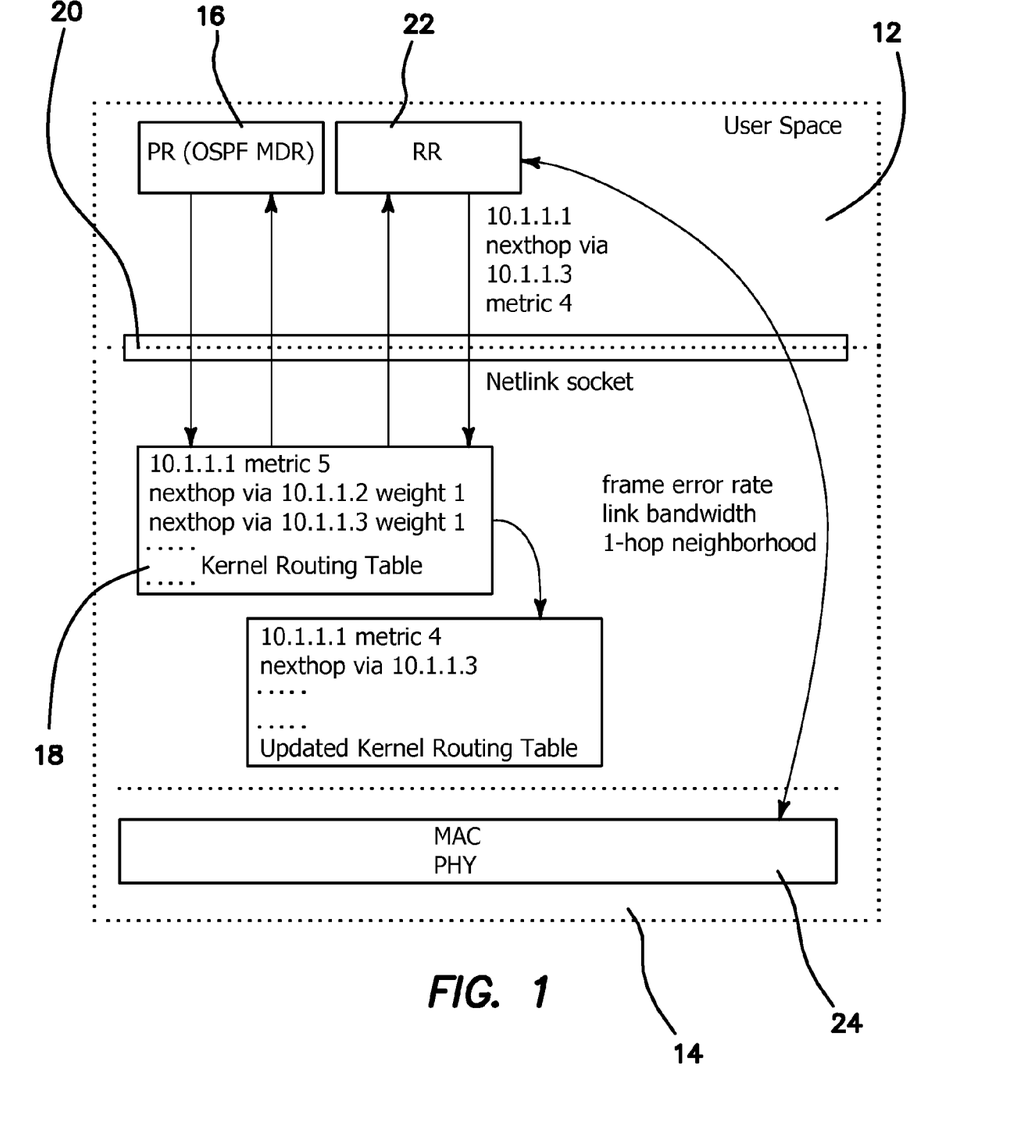
FIG. 1 is a block diagram of the current method of an HCLR protocol operation utilizing a sample set of IP addresses.

FIG. 1 illustrates an overview of HCLR using a sample set of IP addresses. In the figure, it is assumed that all of the routing components are running in the user space of Linux and MAC/PHY layers are running in the kernel space of Linux. The Netlink Socket is used for all the communications between HCLR and kernel. Notably, both routing protocols and MAC/PHY can be running at either a user space 12 or a kernel space 14 without the need to change the interface.

Turning to FIG. 1, the flow of fundamental events is depicted. Assuming ECMPs exist, a PR 16 generates a routing table in the user space 12 and sets a kernel routing table 18 via a netlink socket 20. If a RR 22 is enabled, it periodically reads the kernel routing table 18 and requests the link quality information as well as one-hop neighborhood topology from a MAC layer 24 depending on the operating mode of the RR 22. Also seen in FIG. 1, the RR 22 performs in a 0 hop neighborhood and thus no neighborhood information is used. The RR 22 then calculates the route cost for each next-hop in the ECMP group utilizing a 2-tuple metric that combines the network congestion level and the link quality. Next, if there is a significant difference between the new calculated route cost and the previously saved cost, the RR 22 adjusts the query time interval. Assuming the RR 22 selects the next hop as 10.1.1.3, the RR 22 sets a new route for 10.1.1.1 which only has one next hop (i.e., 10.1.1.3) and a metric smaller than the original one. The latter would not change the routes set by the PR 16 and the kernel 18 automatically selects the new route. Once the new route added by the RR 22 is removed, the original routes set by the PR 16 will be recovered automatically.

As discussed above, HCLR is a hybrid routing protocol in which local on-demand route discovery is used to capture the link effects in an n-hop neighborhood, where n is either 0 or 1. Consequently, the RR 22 can operate at two modes: Parallel Routing Search (PRS) in a 0-hop neighborhood and Triangular Routing Search (TRS) in a 1-hop neighborhood. While PRS is implemented as a naive tie breaker among ECMP groups, TRS performs a more complex yet more efficient routing discovery. For a given router and if ECMP routes exist, the RR 22 operates at the PRS mode. Otherwise, the TRS mode is enabled.

Figures 2A, 2B, 3A, 3B:
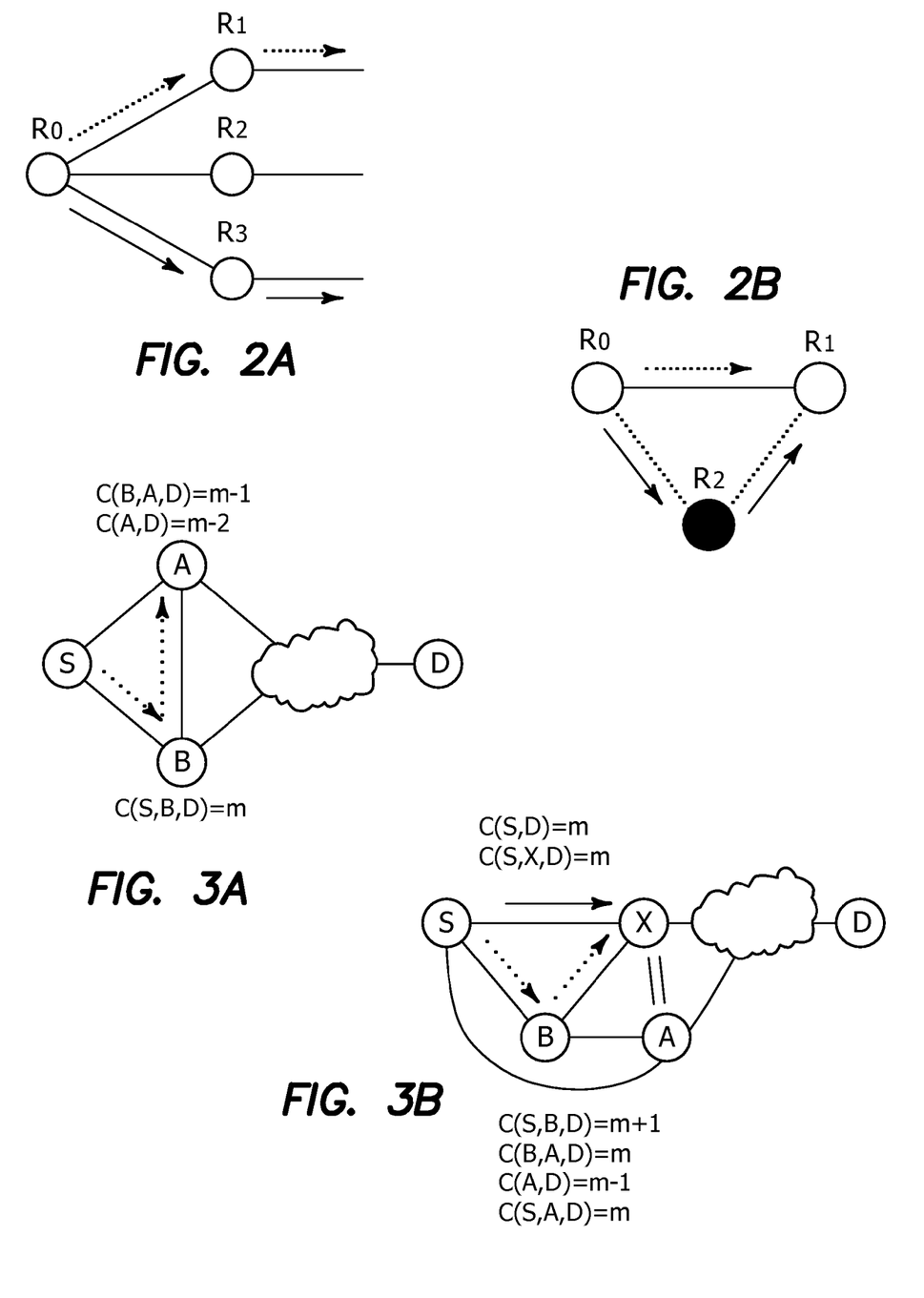
FIG. 2A is a flow diagram of a local on-demand routing discovery of the current invention operating in the PRS mode.
FIG. 2B is a flow diagram of a local on-demand routing discovery of the current invention operating in the TRS mode.
FIGS. 3A and 3B are flow diagrams of the proof of the solution found in the TRS mode shown in FIG. 2B.

FIG. 2A illustrates how the PRS operates. As can be seen, $R_0$ has three candidates as the next hop. The broken arrow lines show the forwarding path without RR 22 and the solid arrow lines show the actual forwarding path. Since the cost for the bottom link is the smallest, $R_3$ is selected as the next hop. In this scenario, RR 22 simply serves as a tie breaker and always selects the link with the best quality. In contrast, the TRS is more complicated and is used in cases for which the router has only one candidate for next hop. In this case, the use of PRS would not help. As indicated in previous works, routing protocols using hop count tend to select a link with a longer length but a weaker receive power which might result in high link error rates. To compensate against the latter, RR performs 22 TRS for potential route alternatives in one-hop neighborhoods.

FIG. 2B illustrates the operation of the TRS. In the figure, $R_0$ only has one next hop $R_1$. The black node $R_2$ is an outlier and is not on the shortest path to the destination. The RR 22 examines the cost of the path $P(R_0-R_2-R_1)$. If $C(R_0, R_2)+C(R_2, R_1)<C(R_0, R_1)$, then the RR 22 selects $R_2$ as the next hop even when $R_2$ is not on the original shortest path to the destination. While seemingly straightforward and simple, such design introduces unique challenges. Upon the arrival of a packet from node $R_0$ at $R_2$, $R_2$ has to determine: 1) if the packet receipt is the result of $R_0$ performing TRS; 2) if $R_2$ itself is the outlier; and 3) if $R_2$ is the outlier, how to re-route the packet back to $R_1$. Notably, $R_2$ has two options: to forward the packet either directly re-route it back to $R_1$ or to perform another PRS in case $R_2$ has other alternatives to the destination. While performing recursive TRS is prohibited due to complexity and unpredictability, it is preferred to re-route the packet back to $R_1$ instead of performing PRS.

The formulation of the TRS algorithm is given below and shown in FIG. 3A. Given a source S and a destination D, assume that node B is a one-hop neighbor of S. If B receives a packet from S, B searches its one-hop neighborhood. If there exists a node A which is both the next hop of B to D and a one-hop neighbor of S, then the packet reaches B as the result of performing TRS at S. In this case, as shown in FIG. 3A, B is the outlier and A is the only next hop of S on the shortest path. Then, B forwards the packet to A. Otherwise, B performs PRS or TRS depending on the number of existing possible next hops.

The proof of this algorithm is provided below. Denote C(X,Y) as the cost of the shortest path from X to Y. Denote C(X, Z, Y) as the cost of the shortest path from X to Y through Z. The Proof consists of three steps and is illustrated in FIG. 3B. Assume B receives a packet from S and node A is both the next hop of B to D and a one-hop neighbor of S.

In the first step, we prove S only has a single next hop to D. Assume S has an ECMP including B and C(S, B, D)=m. Because A is B's next hop, then C(B,A,D)=m−1=>C(AD)=m−2. However, A is also a one-hop neighbor of S. Thus, there exists C(S, A, D)=m−1 which is less than C(S, B, D). The latter contradicts with the assumption and therefore S only has one next hop as shown by FIG. 3A.

In the next step, we prove that B must be an outlier if S only has a single next hop. If B is not an outlier, then B must be the only next-hop of S. Then, we have C(S, B, D)=m and C(B, D)=m−1. Since there exists a node A in both B's next hop list and the list of one hop neighbors of S, we have C(B, A, D)=m−1=>C(A, D)=m−2 and C(S, A, D)=m−1 which is less than C(S, B, D) contradicting with the assumption. Thus and as shown by FIG. 3A, B must be the outlier.

In the final step, we prove that A must be the only next hop of S if B is the outlier. If A is not the only next hop of S, then A is an outlier too. There must exist a node X that is the only next hop of S. Assume C(S, D)=C(S, X, D)=m, then C(S, B, X, D)=m+1. Since A is in both the next hop list of B and the one hop neighbor list of S, we have C(B, A, D)=m=>C(A, D)=m−1 and C(S, A, D)=m. Hence, both A and X are the next hop from S to D with the same cost contradicting with the assumption. Thus and as shown by FIG. 3B, A must be the only next hop of S.

Figure 5:
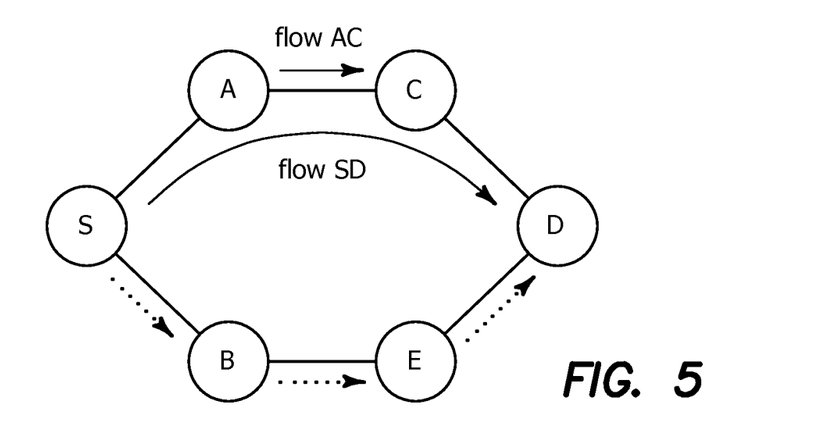
FIG. 5 is a flow diagram of the load balancing experiment of the current invention.

As discussed above, PRS and TRS utilize a 2-tuple metric $(\rho, \tau)$. While $\rho$ is a (MAC-perceived) load factor of the link indicating the congestion level, $\tau$ is a variation of the Expected Transmission Time (ETT) metric. Note that in HCLR, the load factor used for calculating the metric is not from the downstream link of a given router, but the downstream link of its next hop. This situation is illustrated in FIG. 5. Original ETT is a function of the Packet Loss Rate (PER) of the forward link and the PER of the reverse link, where the PER is obtained by sending probe packets at the network layer. In contrast, $\tau$ uses the PER calculated at the MAC layer. Recall that a drawback of using ECMP is the out of order delivery due to the variation of latency. The $\tau$ metric is used to avoid out of order delivery by selecting the link with smallest $\tau$ when the RR 22 is operating in either PRS or TRS mode. If there is another tie in the PRS mode, $\rho$ is used for the purpose of load balancing. Specifically, the load balancing operation will be triggered only if two conditions are satisfied. The first condition is met when the load factor of the selected next hop using ETT metric is beyond 80%. The second condition is met when the difference between the alternative and the selected next hop is at least 15%. It should be noted that the setting of the parameters represent the current best practical findings.

Experimental studies were carried out using the combination of Linux namespaces and a ns-3 network simulator. In the test environment, the routing implementation runs in real-time and produces and/or consumes "live" network traffic. While Linux network namespaces (netns) are used as virtual hosts, ns-3 is used to create a virtual network topology and provide MAC/PHY functionality, the details of how to setup and test such an emulation being well known. The Linux namespaces were utilized to create 45 virtual nodes on a Dell Vostro 220 computer with 2 GB memory and a 3 GHZ Core2 Duo CPU. Linux Fedora Core 12 was used and the kernel version was 2.6.31.

Two random network topologies were created in an area of 800×800 meters. The first topology contains 30 nodes and the second contains 45 nodes. The maximum number of hops is set to 6 in order to enable more than one ECMP to be generated. While the MAC is "802.11a" working at "OfdmRate54 Mbps" mode, the propagation loss follows the Rayleigh model. Furthermore, mobility is provided using a random walk mobility model as is known. Each emulation runs for 300 seconds. When needed, an iperf is used to create TCP and UDP traffic.

Figure 4:
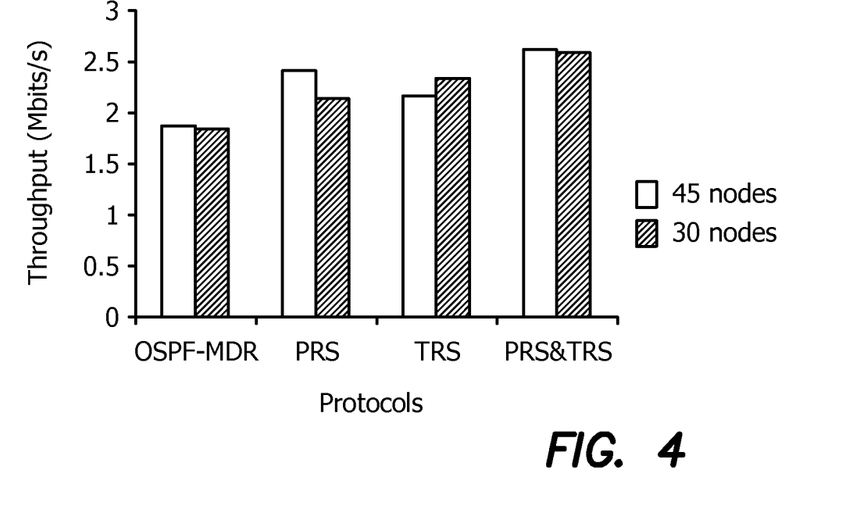
FIG. 4 is a bar graph of the comparison of TCP throughput for OSPF-MDR, PRS, TRS, and PRS+TRS at 30 nodes and at 45 nodes.

First, we evaluate the effects of PRS and TRS on performance by selecting a pair of nodes between which both ECMP and single next hop exist for both topologies. FIG. 4 compares the end-to-end TCP throughput of OSPFMDR and HCLR in both topologies. We measure the throughput of HCLR in the cases of: 1) PRS-only, 2) TRS-only, and 3) PRS and TRS. In all of the cases shown in FIG. 4, HCLR outperforms OSPF-MDR. In the 45-node topology, PRS and TRS achieves nearly a 45% higher throughput than OSPF-MDR where TRS only contributes to about 16% improvement because there are only two hops that can utilize TRS. While the overall improvement in the 30-node topology is similar to that in 45-node topology, TRS contributes more as there are more single next hops in a lower density networks.

Next, we evaluate the overhead of performing HCLR. In our evaluation, the search results are not applied to the kernel routing table, albeit HCLR still performs PRS and TRS. It turns out the overhead associated with HCLR is negligible. Besides, no load balancing is performed because there is only one flow. In order to evaluate the effect of the load balancing scheme of HCLR, we create a simple 6-node topology illustrated in FIG. 5. There are two flows in the figure, one from node A to C and another from S to D. Node S has two candidates as its next hop: node A or node B. Assume C(S,A,D)=C(S,B,D), then OSPF-MDR would not be able to capture the effect of flow AC and is thus subject to congestion on link AC. In contrast, by comparing the load factor of link AC and link BE, HCLR would select B as the next hop because there is no flow on link BE. As anticipated, HCLR can achieve nearly a 50% higher throughput than OSPF-MDR showing the efficiency of using our 2-tuple metric.

Figure 6:
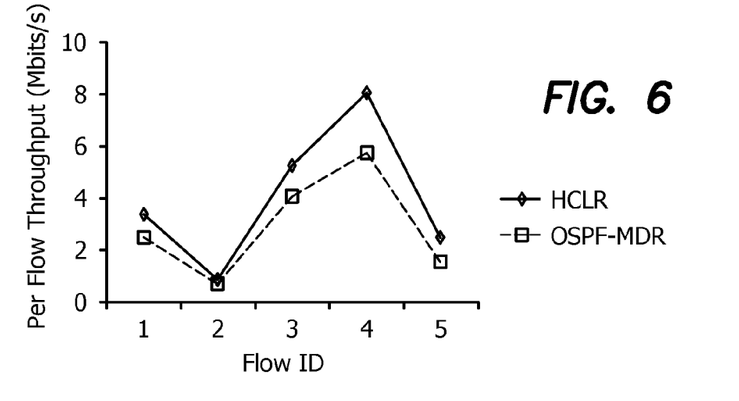
FIG. 6 is a graph of the comparison of TCP throughput for OSPF-MDR versus the current invention.
Figure 7:
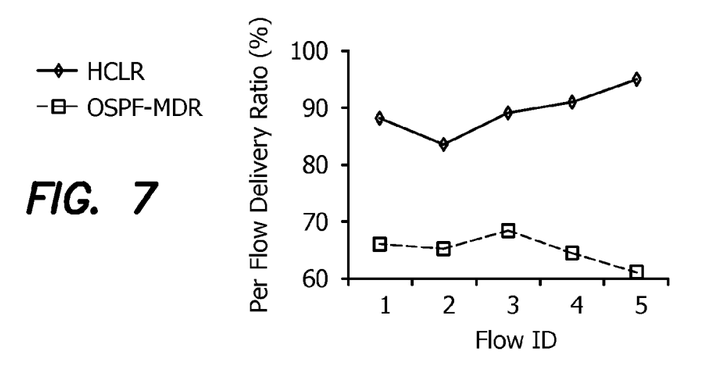
FIG. 7 is a graph of the comparison of TCP packet delivery ration for OSPF-MDR versus the current invention

Then, using a 45-node topology, we evaluate the overall performance of HCLR by randomly selecting 5 pairs of nodes that are at least 3 hops apart. FIG. 6 compares the per flow throughput of OSPF-MDR and HCLR. While HCLR outperforms OSPF-MDR in all cases, the throughput of each flow is quite different due to the number of hops traversed. Flow 4 achieves the highest throughput as it only traverses 3 hops, while flow 2 traversing 6 hops achieves the lowest throughput. Since flow 2 and flow 5 have a common shared link, their performances are slightly coupled. The latter results in lowering of the throughput of both flows. Note that performance improvements vary from one flow to another as there are not always better alternative routes for HCLR. FIG. 7 compares the delivery ratio of OSPF-MDR with that of HCLR. Due to avoiding packet delivery over higher loss rate links in all of the cases, HCLR consistently delivers 20% more packets than OSPF-MDR.

Figure 8:
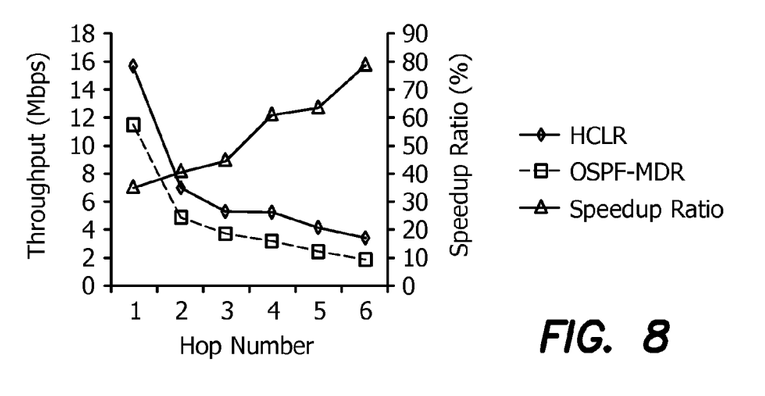
FIG. 8 is a graph of the effects on TCP throughput for OSPF-MDR versus the current invention and speed up ratio as a function of hops present.

Finally, we illustrate the performance improvement of HCLR measured in terms of throughput and speedup ratio as the number of hops varies between two nodes. Speedup ratio is defined as the difference of the throughputs of HCLR and OSPF-MDR divided by the throughput of OSPF-MDR. FIG. 8 compares the throughput achieved by OSPF-MDR and HCLR as the number of hops increase from 1 to 6 between two selected nodes. Note that when the number of hops is 1, only TRS is performed and thus the lowest speedup ratio is achieved. As anticipated, HCLR consistently outperforms OSPF-MDR, offering at least a 39% higher throughput than OSPF-MDR. While the throughput performance gap is relatively flat, the speedup ratio consistently increases as the number of hops between two nodes increases. While there is a higher probability of losing packets in the case of OSPFMDR, such losses are compensated in the case of HCLR by choosing higher quality links with lower packet error rates on each hop. While not explicitly shown here, HCLR consistently outperforms OSPF-MDR in the case of TCP traffic as well.

It is important to note that our experiments with other propagation loss models have yielded similar patterns as those reported here illustrating that HCLR always outperforms OSPF-MDR.

A natural question would be why not apply a cross-layer metric to OSPF MDR. There are several concerns. First, the Link State Advertisement (LSA) in OSPF-MDR only describes the interface-based cost, but not the link-based cost. As the shortest cost of a path is calculated by adding up the cost of each interface covered by the path, a router only needs to broadcast the cost of its interface which is efficient for non-cross-layer routing. However, a cross-layer metric would require to broadcast the cost of each link as the cost of a route is no longer solely determined by the ingress interface. Rather, the cost is determined by both ingress and egress interfaces of a link which could introduce a significant overhead and make this approach impractical. Second and in the absence of local on-demand route discovery, applying a cross-layer metric to OSPF MDR still cannot solve the TSD problem discussed above.

Another problem is that HCLR cannot completely solve the TSD problem considering potential MAC scheduling latencies. In other words, while HCLR allows for making intelligent routing decisions at the network layer, it does not guarantee a packet can be transmitted immediately once it is delivered to MAC/PHY. Instead of making routing decision at the network layer, another alternative could utilize the anycasting approach known in the prior art in which a subset of routing table entries are delivered to the MAC layer. Then, the MAC performs the final route selection. While this approach could further narrow down the TSD, it requires substantial modifications to the MAC and introduces significant deployment and compatibility issues.

As presented above, ECMP could introduce MTU and out of order delivery problems. In MANETs, it is safe to assume the MTU for each node is the same. Thus, we focus on how HCLR avoids various latency problems. In HCLR framework, the Linux kernel would not be aware of the existence of ECMP and the route selection is performed by the RR component. Since the RR performs local on-demand route search with a 2-tuple metric that considers the link latency and link capacity, HCLR ensures that a packet is always forwarded along the link with the smallest expected transmission time. Thus, HCLR can avoid out of order delivery caused by route selection in ECMP.

The current invention is a Hybrid Cross-Layer Routing (HCLR) protocol. HCLR can overcome the limitations of both proactive and reactive routing protocols in MANETs by combining their advantages. HCLR generates the routing table globally but performs optimizations locally utilizing an on-demand approach. HCLR is the first work that takes advantage of Equal Cost Multi Path to perform cross-layer routing optimization in MANETs. It is also noted that HCLR can not only forward packets following a high link quality path, but also perform load balancing without being subject to out of order delivery problem by utilizing a 2-tuple metric. We implemented HCLR in Linux Quagga routing suite. Through experimental studies in an emulation testbed, it is demonstrated that HCLR can achieve a significant performance improvement measured in terms of per flow throughput, average packet delay, and packet delivery ratio.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method for wireless network routing using hybrid cross-layer routing (HCLR) comprising:
   generating a global equal cost multi-paths (ECMP) routing table;
   calculating a route cost for each next-hop in the ECMP routing table;
   adjusting a query time interval if there is a significant difference between the generated ECMP routing table and the calculated route cost for each next-hop in the ECMP routing table;
   updating the ECMP routing table with the calculated route cost for the next-hop; and
   recovering the original ECMP routing table,
   wherein calculating a route cost for each next-hop in the ECMP routing table comprises performing optimizations locally using reactive routing in a parallel routing search mode when in a 0-hop neighborhood.

2. The method of claim 1 where generating a global equal cost multi-paths (ECMP) routing table comprises generating a routing table using proactive routing.

3. The method of claim 1 where performing optimizations locally using reactive routing comprises operating in the reactive routing in a triangular routing search mode when in a 1-hop neighborhood.

4. The method of claim 1 where performing optimizations locally using reactive routing comprises utilizing a 2-tuple metric.

5. The method of claim 1 where performing optimizations locally using reactive routing comprises:
   operating in the reactive routing in a parallel routing search mode when in a 0-hop neighborhood; and
   operating in the reactive routing in a triangular routing search mode when in a 1-hop neighborhood.

6. The method of claim 1 where using HCLR further comprises performing cross-layer routing optimization in mobile ad hoc networks (MANETs) using the generated ECMP routing table.

7. The method of claim 6 where using the Hybrid Cross-Layer Routing (HCLR) protocol comprises forwarding packets following a high link quality path, and performing load balancing without being subject to out of order delivery problem by utilizing a 2-tuple metric.

8. The method of the claim 1 where using HCLR comprises overcoming the limitations of performing load balancing with equal cost multi-paths (ECMP) using a 2-tuple cross-layer routing metric.

9. A method for using a Hybrid Cross-Layer Routing (HCLR) protocol comprising a proactive and a reactive component, the method comprising:
   adjusting the a routing table based on the link quality information measured at a MAC layer;
   generating global routing paths with the proactive component;
   avoiding long delays associated with reactive routing protocols (RRPs); and
   making local routing decisions with the reactive component based on available cross-layer information,
   wherein making local routing decisions with the reactive component based on available cross-layer information comprises operating reactive component in a parallel routing search mode when in a 0-hop neighborhood.

10. The method of claim 9 where using the Hybrid Cross-Layer Routing (HCLR) protocol comprises overcoming the limitations of both proactive and reactive routing in mobile ad hoc networks (MANETs) using a cross-layer routing metric.

11. The method of claim 9 where using the Hybrid Cross-Layer Routing (HCLR) protocol comprises using HCLR to transparently operate with a proactive routing protocol (PRP) as long as the PRP is equal cost multi-path (ECMP) capable.

12. The method of claim 9 where using the Hybrid Cross-Layer Routing (HCLR) protocol comprises improving routing efficiency without incurring long delays using a local on-demand routing protocol in an n-hop neighborhood.

13. The method of claim 9 where making local routing decisions with the reactive component based on available cross-layer information comprises operating in the reactive routing in a triangular routing search mode when in a 1-hop neighborhood.

14. The method of claim 9 where making local routing decisions with the reactive component based on available cross-layer information comprises utilizing a 2-tuple metric.

15. The method of claim 9 where making local routing decisions with the reactive component based on available cross-layer information comprises:
  operating in the reactive routing in a parallel routing search mode when in a 0-hop neighborhood; and
  operating in the reactive routing in a triangular routing search mode when in a 1-hop neighborhood.

16. The method of claim 9 where using a Hybrid Cross-Layer Routing (HCLR) protocol comprises routing digital signals by performing cross-layer routing optimization in a mobile ad hoc network (MANET) using a ECMP routing table generated by the proactive component.

17. A computer tangible medium comprising a set of software instructions for controlling a wireless routing network according to the method of claim 1.

* * * * *